United States Patent [19]

Eckhard

[11] 4,284,025

[45] Aug. 18, 1981

[54] RUDDER ARRANGEMENT FOR SHIPS

[75] Inventor: Klaus Eckhard, Eckernförde, Fed. Rep. of Germany

[73] Assignee: Howaldtswerke-Deutsche Werft Aktiengesellschaft Hamburg und Kiel, Kiel, Fed. Rep. of Germany

[21] Appl. No.: 57,488

[22] Filed: Jul. 13, 1979

[30] Foreign Application Priority Data

Aug. 3, 1978 [DE] Fed. Rep. of Germany ....... 2834015

[51] Int. Cl.$^3$ ............................................. B63H 25/38
[52] U.S. Cl. ..................................... 114/163; 114/167
[58] Field of Search ............... 114/162, 163, 164, 167; 244/87

[56] References Cited

U.S. PATENT DOCUMENTS

| 1,529,036 | 3/1925 | Richey | 114/163 |
| 2,972,324 | 2/1961 | Williams | 114/163 |
| 3,080,845 | 3/1963 | Pollak | 114/163 |
| 3,580,208 | 5/1971 | Hinckley | 114/163 |
| 3,606,852 | 9/1971 | Cafiero | 114/163 |

FOREIGN PATENT DOCUMENTS

| 2218622 | 11/1973 | Fed. Rep. of Germany | 114/163 |
| 2656738 | 6/1978 | Fed. Rep. of Germany | 114/167 |
| 310366 | 8/1933 | Italy | 114/162 |

Primary Examiner—Charles E. Frankfort
Attorney, Agent, or Firm—John C. Smith, Jr.

[57] ABSTRACT

A rudder arrangement for ships comprises a rudder blade having a horizontal division to form an upper and a lower rudder blade. Each rudder blade is controllable as a separate rudder blade via a rudder shaft and an associated rudder machine.

5 Claims, 8 Drawing Figures

RUDDER ARRANGEMENT FOR SHIPS

BACKGROUND OF THE INVENTION

This invention relates to a rudder arrangement for ships.

Rudder arrangements for large ships are known in various embodiments. Next to the different rudder types such as full-balanced rudders and semi-balanced rudders there are also rudder arrangements which are formed as two or more-part rudders vertically divided for producing high rudder translatory forces. Furthermore, it is known to provide for advantageous flow conditions for certain tasks by additional stationary fins.

With conventional rudder systems, the problem arises that rudder damages may occur which result in a failing of the rudder system and substantial risks occur for ship and environment as a result of the non-manoeuvrability caused thereby. For a damaging of the rudder system, frequently ground contact accompanied by a jamming or distortion of the rudder shaft is responsible, or bearing damages occur.

SUMMARY OF THE INVENTION

It is, therefore, the object of the present invention to provide for a rudder arrangement for ships which insures a high operational reliability of the rudder and additionally improves the operational conditions.

To attain this object, the present invention provides a rudder arrangement for ships comprising a rudder blade having a horizontal division to form an upper and a lower rudder blade and each rudder blade being controllable as a separate rudder blade via a rudder shaft and an associated rudder machine.

Thereby, the advantage is obtained that the separate rudder blades may be operated completely independent and thus a high operational reliability is provided for.

Furthermore, the upper rudder blade is protected against ground contact, so that a very frequent risk is principly excluded and even in the event of a breaking of the lower rudder blade an operationability is maintained. Next to these safety performances of the proposed arrangement it is permitted to achieve a crosswise position of the rudder blades and to thus bring about a shortening of the stopping distance when sailing straight ahead. As a result of the differently positionable rudder angles of the individual rudder blades, the porting and unporting manoeuvers of the ship are able to be assisted.

A further advantage is that when cruising with cruising speed outside of a channel or a river a control may be effected only through the intermediary of the upper rudder blade and thereby cavitation damages are able to be reduced. When damages occur, furthermore often only one rudder blade must be exchanged so that savings also result therefrom.

A simple arrangement according to the invention is that the upper rudder blade is formed as non-balanced rudder and the lower rudder blade is formed as full-balanced rudder. By this arrangement, even large forces for the entire rudder are distributed better so that for instance pintles arranged may be rated for lesser forces than in conventional arrangements.

A favorable embodiment is provided for in that the upper rudder blade is arranged in the horizontal extension of a rudder horn.

In order to maintain advantageous flow conditions with the rudder placed and position the trailing edges of the rudder blades above one another, it is proposed that the two rudder blades are adjustable synchronously via a coupling.

A space-saving arrangement is provided for in that the rudder shafts are arranged coaxially.

Furthermore, it is proposed that the lower rudder blade is arranged in the region of the propeller shaft. Thereby, it is possible to perform an economical assembly since when drawing the propeller shaft the lower rudder blade must merely be disassembled.

In order to also insure safety against destruction or impairment of the interior spaces, it is provided for that the rudder machines are arranged vertically offset in different decks.

BRIEF DESCRIPTION OF THE DRAWINGS

Three embodiments of the invention will now be described by way of example and with reference to the accompanying drawings in which.

DESCRIPTION OF THE PREFERRED EMBODIMENTS

Figure 1:
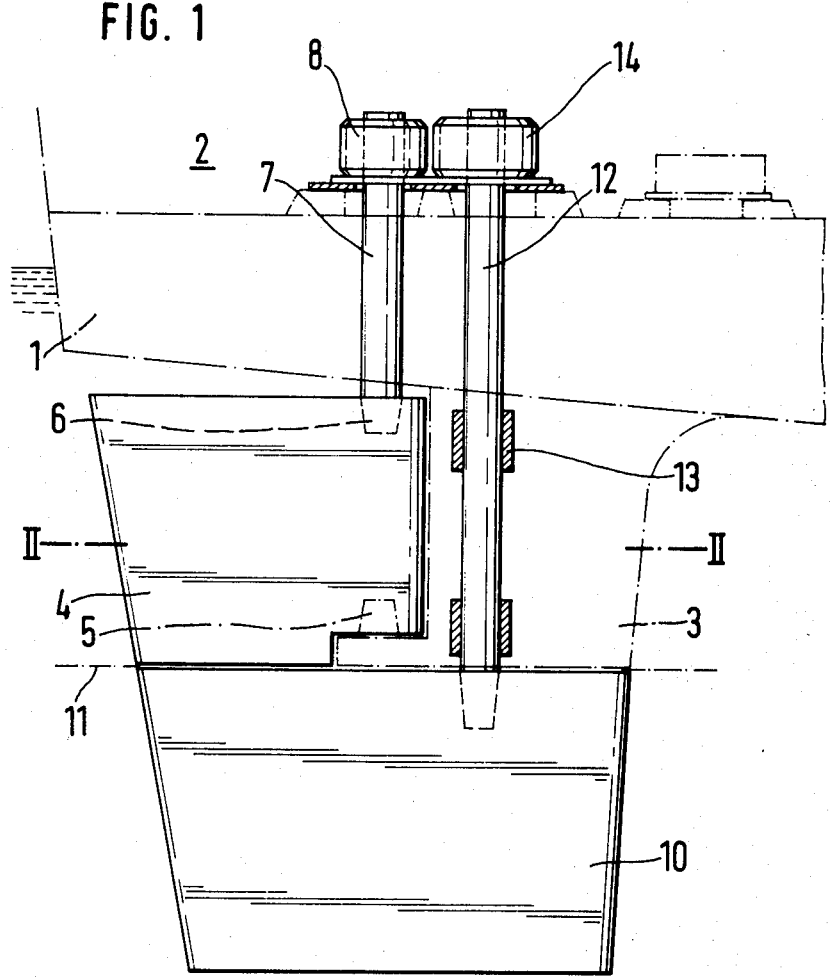
FIG. 1 is a side-elevational view, partly in section, of a rudder arrangement with rudder shafts arranged parallel and rudder machines arranged in the same plane.
Figure 2:
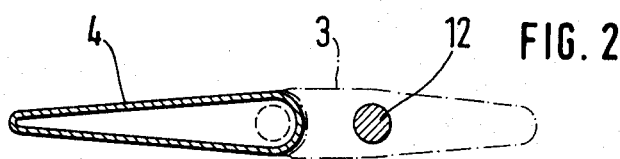
FIG. 2 is a sectional view taken on the line II—II of FIG. 1.
Figure 3:
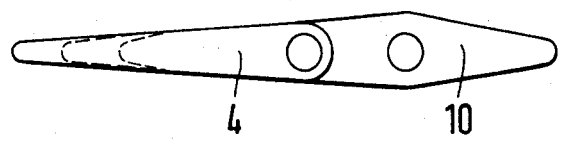
FIGS. 3 to 6 are plan views of the rudder blades arranged above one another in different positions.
Figure 4:
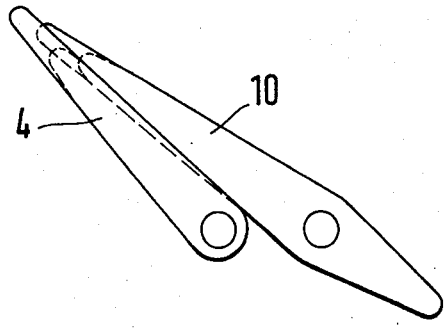

FIG. 1 shows the stern 1 of a ship including a rudder machine room 2. The stern 1 carries a rudder horn 3 in a conventional manner. The rudder horn 3 is continued by a non-balanced rudder blade 4. The rudder blade 4 is mounted with a pintle 5 and kept rotatable by a mounting bearing 6. The rudder blade 4 is connected to a rudder shaft 7 which passes to the rudder machine room 2 and is associated with a rudder machine 8 to be controlled thereby. The drive is effected via hydraulic drive units 9 not illustrated in closer detail. Underneath the rudder blade 4 and the rudder horn 3, a further rudder blade 10 in the type of a balance rudder is provided so that the two rudder blades 4 and 10 are separated by a horizontal separating line 11.

The lower rudder blade 10 likewise has an associated rudder shaft 12 which is supported via mounting bearings 13 in the rudder horn 3 and passes to a rudder machine 14 in the rudder machine room 2.

The hydraulic drive units 9 are associated with both rudder machines 8 and 14 in this embodiment. Of course also separate drive units 9 may be provided.

Figure 5:
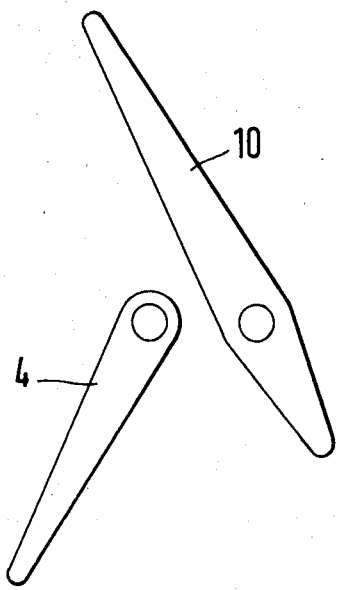
Figure 6:
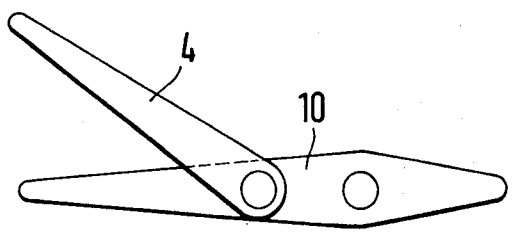

FIGS. 3 to 6 show different positions of the rudder blades 4 and 10, FIG. 5 depicting a deceleration position.

Figure 7:
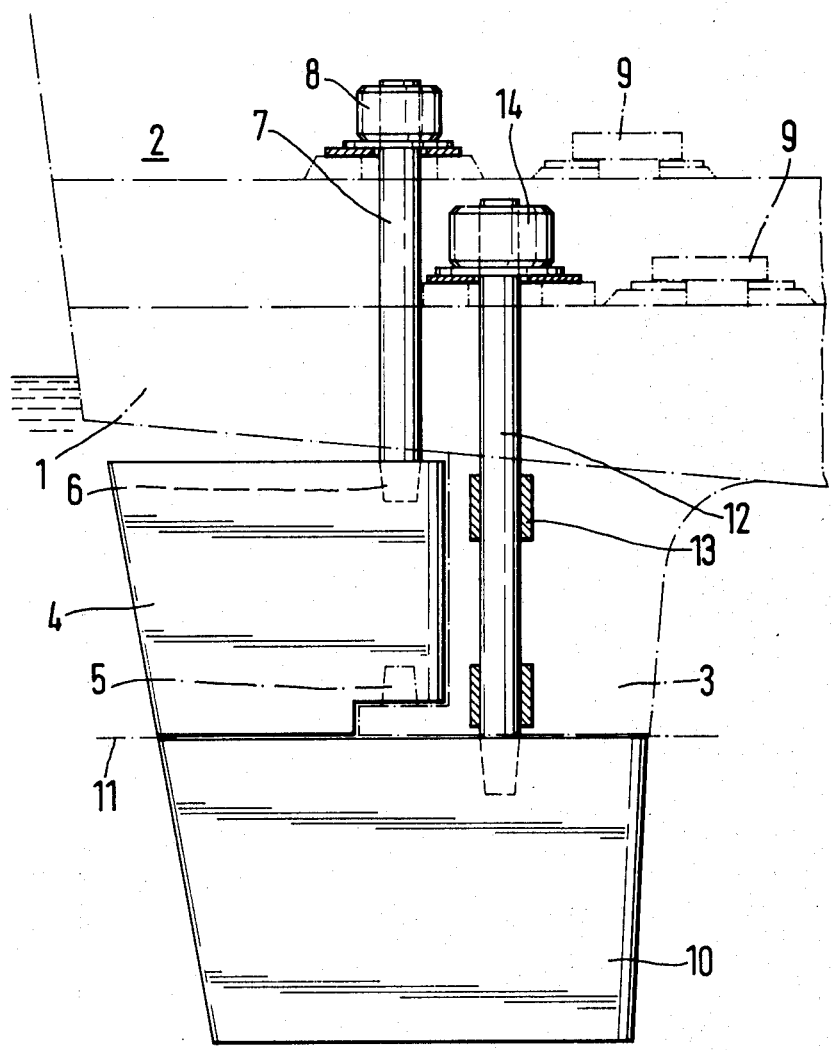
FIG. 7 is a side-elevational view according to FIG. 1 with rudder machines offset vertically according to a second embodiment.
Figure 8:
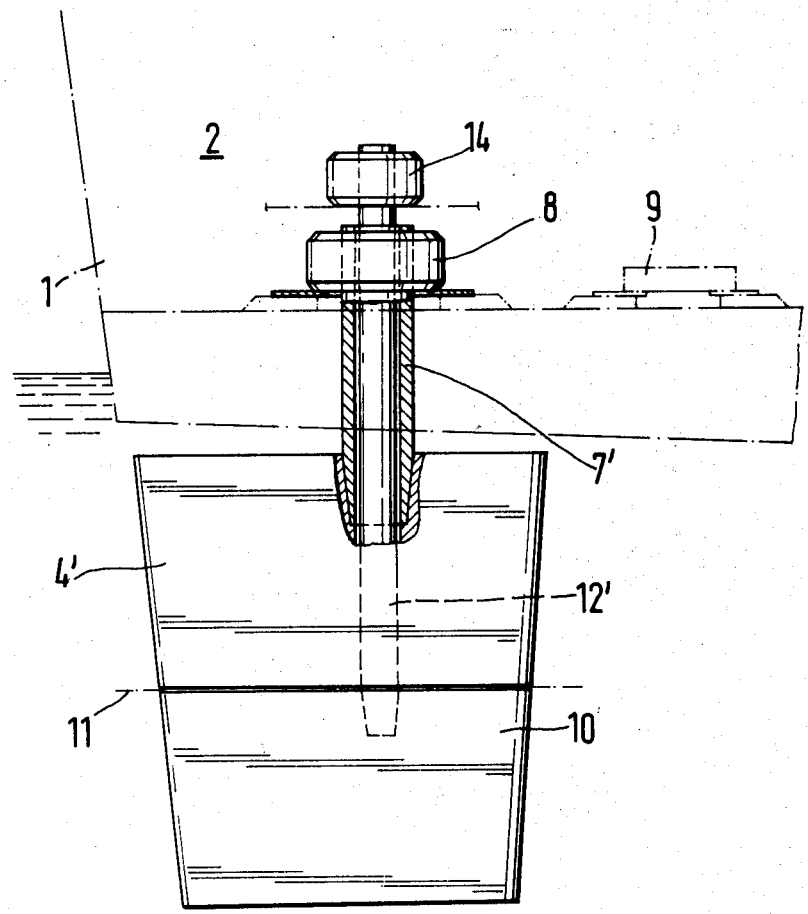
FIG. 8 is a side-elevational view of a third embodiment of a rudder arrangement with rudder shafts arranged coaxially and rudder machines arranged offset.

For further increasing safety, according to FIG. 7 (second embodiment) and FIG. 8 (thrid embodiment), the rudder machines 8 and 14 are arranged on different decks; the basic arrangement is not altered, however.

The third embodiment according to FIG. 8 shows an arrangement in which the rudder blades 4' and 10' are arranged on coaxially arranged rudder shafts 7' and 12'.

The rudder shaft 7' is formed as a hollow shaft, while the shaft 12' is made of solid material.

The invention may be embodied in other specific forms without departing from the spirit or essential characteristics thereof. The embodiments are therefore to be considered in all respects as illustrative and not restrictive.

What is claimed is:

1. A ship comprising:
   (a) a hull including a stationary rudder horn extending downwardly, said horn having a substantially horizontal bottom edge, a substantially vertical rear edge and a portion extending rearwardly adjacent said bottom edge of said horn;
   (b) an upper rudder blade extending rearwardly from said rudder horn, the forward end thereof being positioned between said hull and said rearwardly extending portion;
   (c) first means mounting said upper rudder blade for pivotal movement about an axis extending between said hull and said rearwardly extending portion;
   (d) a lower rudder blade positioned below said rudder horn;
   (e) second means mounting said lower rudder blade for pivotal movement about an axis passing through said horn;
   (f) said axes being non-coincident; and
   (g) first and second drive means for pivoting said upper and lower rudder blades respectively independently of each other;
   (h) whereby the steering capability of said ship is maintained in the event one of said mounting means is inoperable.

2. A ship according to claim 1 wherein said first and second axes are substantially vertically disposed in spaced parallel relationship.

3. A ship according to claim 1 wherein said upper rudder blade is a non-balanced rudder and said lower rudder blade is a fully balanced rudder.

4. A ship according to claim 1 wherein said first and second drive means are arranged vertically offset on different decks.

5. A ship according to claim 1 wherein said first and second drive means are combined in a single structural unit.

* * * * *